(12) United States Patent
Otani et al.

(10) Patent No.: US 12,217,744 B2
(45) Date of Patent: Feb. 4, 2025

(54) SYSTEM AND METHOD WITH NEURAL REPRESENTATION OF EVENT-CENTRIC COMMONSENSE KNOWLEDGE FOR RESPONSE SELECTION

(71) Applicant: Robert Bosch GmbH, Stuttgart (DE)

(72) Inventors: Naoki Otani, Pittsburgh, PA (US); Jun Araki, San Jose, CA (US); Hyeongsik Kim, San Jose, CA (US)

(73) Assignee: Robert Bosch GmbH, Stuttgart (DE)

(*) Notice: Subject to any disclaimer, the term of this patent is extended or adjusted under 35 U.S.C. 154(b) by 604 days.

(21) Appl. No.: 17/226,594

(22) Filed: Apr. 9, 2021

(65) Prior Publication Data

US 2022/0328038 A1   Oct. 13, 2022

(51) Int. Cl.
   *G10L 15/18* (2013.01)
(52) U.S. Cl.
   CPC ................................. *G10L 15/18* (2013.01)
(58) Field of Classification Search
   CPC ......... G10L 15/18; G10L 15/22; G10L 15/16; G10L 15/183; G10L 15/063; G10L 15/285; G10L 2015/223; G10L 2015/225; G10L 2015/226; G10L 15/06; G10L 15/26; G06F 40/35; G06F 40/30; G06F 40/216; G06F 16/3329; G06F 16/3344; G06F 40/211; G06F 16/3347; G06F 16/335;

(Continued)

(56) References Cited

U.S. PATENT DOCUMENTS

| | | | |
|---|---|---|---|
| 2020/0098353 A1 | 3/2020 | Olabiyi | |
| 2020/0410012 A1* | 12/2020 | Moon | G06Q 10/04 |
| 2022/0309230 A1* | 9/2022 | Lawrence | G06N 7/01 |

OTHER PUBLICATIONS

Moon et al., "OpenDialKG: Explainable Conversational Reasoning with Attention-based Walks over Knowledge Graphs," Proceedings of the 57th Annual Meeting of the Association for Computational Linguistics, pp. 845-854, Florence, Italy, Jul. 28-Aug. 2, 2019. (Year: 2019).*

(Continued)

*Primary Examiner* — Angela A Armstrong
(74) *Attorney, Agent, or Firm* — Kathy Takeguchi; Maginot, Moore & Beck LLP (57) ABSTRACT

A computer-implemented system and method relate to natural language processing and knowledge representation and reasoning. A first dataset is created that includes input data and situational data. The situational data provides context for the input data. An encoder is configured to generate an encoded representation of the first dataset. The encoder includes at least an encoding network of a first pre-trained generative machine learning model, which relates to a generative knowledge graph. A decoder includes a decoding network of a second pre-trained generative machine learning model. The decoder is configured to generate response data based on the first dataset by decoding the encoded representation. The decoder is also configured to generate event-centric knowledge based on the first dataset by decoding the encoded representation. The input data and the response data are connected to the same event-centric knowledge via the generative knowledge graph. For example, the event-centric knowledge includes goal data, which is inferred from the input data and the situational data.

18 Claims, 7 Drawing Sheets

(58) Field of Classification Search
CPC ......... G06F 16/90332; G06F 16/90335; G06F 16/9038; G06F 16/3334; G06F 16/353; G06F 40/295; G06F 40/40; G06F 40/44; G06F 40/56; G06F 40/186; G06N 3/045; G06N 3/08; G06N 3/044; G06N 3/084; G06N 5/041; G06N 3/047; G06N 3/04; G06N 3/088; G06N 20/00; G06N 3/006; G06N 5/022; G06N 3/042; G06N 5/00; G06N 5/02; G06N 3/0455; G06N 3/092; G06N 5/04; G06N 7/01; H04L 51/02; H04L 67/01; H04L 67/12
See application file for complete search history.

(56) References Cited

OTHER PUBLICATIONS

Kudo et al., "SentencePiece: A simple and language independent subword tokenizer and detokenizer for Neural Text Processing," Aug. 19, 2018, arXiv:1808.06226v1 [cs.CL], available at https://doi.org/10.48550/arXiv.1808.06226 (Year: 2018).*

Liu et al., "Knowledge Aware Conversation Generation with Explainable Reasoning over Augmented Graphs," Proceedings of the 2019 Conference on Empirical Methods in Natural Language Processing and the 9th International Joint Conference on Natural Language Processing, pp. 1782-1792, China, Nov. 3-7 (Year: 2019).*

Hua et al., "Learning to Detect Relevant Contexts and Knowledge for Response Selection in Retrieval-based Dialogue Systems," CIKM '20, Oct. 19-23, 2020, Virtual Event, Ireland, ACM, New York, NY, USA, 10 pages, available at https://doi.org/10.1145/3340531.3411967. (Year: 2020).*

Bosselut et al. COMET: Commonsense Transformers for Automatic Knowledge Graph Construction. Proceedings of the Association of Computational Linguistics. 2019. pp. 4762-4779.

Madotto et al. Mem2Seq: Effectively Incorporating Knowledge Bases into End-to-End Task-Oriented Dialog Systems. Proceedings of the Association of Computational Linguistics. 2018. pp. 1468-1478.

Raghu et al. Disentangling Language and Knowledge in Task-Oriented Dialogs. Proceedings of NAACL-HLT. 2019. pp. 1239-1255.

Radford et al. Improving Language Understanding by Generative Pre-Training. 2018. 12 pages. https://s3-us-west-2.amazonaws.com/openaiassets/researchcovers/languageunsupervised/languageunderstanding paper.pdf.

Sap et al. ATOMIC: An Atlas of Machine Commonsense for If-Then Reasoning. Proceedings of AAAI. 2019. pp. 3027-3035.

Speer et al. ConceptNet 5.5: An Open Multilingual Graph of General Knowledge. Proceedings of AAAI. 2017. pp. 4444-4451.

Young et al. Augmenting End-to-End Dialogue Systems with Commonsense Knowledge. Proceedings of AAAl. 2018. pp. 4970-4977.

Frank et al. Predicting Pragmatic Reasoning in Language Games. Science. May 25, 2012. vol 336(6084). p. 998 along with supplemental pp. 1-3.

Haozhe et al., "Language Generation with Multi-Hop Reasoning on Commonsense Knowledge Graph," arxiv.org, arXiv:2009.11692v1 [cs.CL], Cornell Univeristy Library, 201 Olin Library Cornell University, Ithaca, NY, 14853, Sep. 24, 2020Sep. 24, 2020, XP081795053, pp. 1-12.

* cited by examiner

SYSTEM AND METHOD WITH NEURAL REPRESENTATION OF EVENT-CENTRIC COMMONSENSE KNOWLEDGE FOR RESPONSE SELECTION

FIELD

This disclosure relates generally to computer-implemented systems and methods involving natural language processing and knowledge representation and reasoning.

BACKGROUND

In general, task-oriented dialogue systems are configured to engage with human users to accomplish tasks. Most task-oriented dialogue systems merely obtain and provide information, which is needed to complete given tasks. Although there are some studies that relate to incorporating external knowledge into task-oriented dialogue systems, those studies mostly involve representing external knowledge as a symbolic knowledge graph G={(s, r, o)}, where s denotes a subject, o denotes an object, and r denotes a relation between the subject and the object. As a non-limiting example, for instance, the symbolic knowledge graph G={(JoeBiden, spouse-of, JillBiden)} represents the knowledge that Joe Biden is the spouse of Jill Biden.

However, there are many drawbacks with respect to directly incorporating symbolic knowledge graphs into task-oriented dialogue systems. For example, symbolic knowledge graphs tend to be costly to construct, update, and maintain. Also, most symbolic knowledge graphs do not scale to other domains and/or other languages. This scalability problem is particularly severe for commonsense knowledge, which is prohibitively broad and diverse.

Furthermore, most symbolic knowledge graphs are entity-centric, thereby focusing on knowledge regarding entities and their relations. In view of this tendency, most prior work on incorporating external knowledge into task-oriented dialogue systems deals only with encyclopedic knowledge centered on entities (e.g., things and concepts) such as "Ovens are in the kitchen," and "Berlin is the capital of Germany." These kinds of entity-centric knowledge significantly restrict reasoning capabilities.

While there are some knowledge bases, such as ConceptNet 5.5, that cover both entities and events, these knowledge bases do not provide sufficient knowledge to a downstream application. For example, a downstream application may require a more complex and realistic piece of knowledge beyond G={(earthquake, cause, tsunami)} such as the additional knowledge that an earthquake causes a tsunami "if the earthquake is strong and happens under an ocean near a land." These kinds of fine-grained or conditioned knowledge may not be available in these knowledge bases, which cover both entities and events.

In addition, there are some technical issues with respect to incorporating knowledge from symbolic knowledge graphs into task-oriented dialogue. For example, there are many language expressions, which do not necessarily match with symbols (or strings) labeled to nodes in the symbolic knowledge graphs. Also, there are some cases in which a language expression in an utterance does not correspond to any nodes (or concepts) in a knowledge graph, thereby hindering the incorporation of external knowledge from symbolic knowledge graphs into task-oriented dialogue.

SUMMARY

The following is a summary of certain embodiments described in detail below. The described aspects are presented merely to provide the reader with a brief summary of these certain embodiments and the description of these aspects is not intended to limit the scope of this disclosure. Indeed, this disclosure may encompass a variety of aspects that may not be explicitly set forth below.

According to at least one aspect, a computer-implemented method includes creating a first dataset that includes input data and situational data. The situational data provides context for the input data. The method includes generating, via an encoder, an encoded representation of the first dataset. The encoder includes an encoding network of a first generative machine learning model that relates to a generative knowledge graph. A decoder includes a decoding network of a second generative machine learning model. The method includes generating, via the decoder, response data based on the first dataset by decoding the encoded representation. The method also includes generating, via the decoder, goal data based on the first dataset by decoding the encoded representation. The goal data is used in multi-hop reasoning to guide the input data to the response data via the generative knowledge graph.

According to at least one aspect, a system includes at least one non-transitory computer readable medium and a processor. The non-transitory computer readable medium includes computer readable data. The processor is operably connected to the non-transitory computer readable medium. The processor is configured to execute the computer readable data to perform a method, which includes obtaining input data and situational data. The situational data provides context for the input data. The method includes creating a first dataset that includes the input data and the situational data. The method includes generating, via an encoder, an encoded representation of the first dataset. The encoder includes an encoding network of a first generative machine learning model that relates to a generative knowledge graph. A decoder includes a decoding network of a second generative machine learning model. The method includes generating, via the decoder, response data based on the first dataset by decoding the encoded representation. The method also includes generating, via the decoder, goal data based on the first dataset by decoding the encoded representation. The input data and the response data are connected to the goal data via the generative knowledge base.

According to at least one aspect, a computer-implemented method includes obtaining input data, situational data, and a candidate response. The situational data provides context for the input data. An encoder includes an encoding network of a first generative machine learning model that relates to a generative knowledge base. The encoder is configured to generate an encoded representation of the input data and the situational data. A decoder includes a decoding network of a second generative machine learning model. The decoder is configured to generate goal data by decoding the encoded representation of the input data and the situational data. The decoder is also configured to generate a likelihood score for the candidate response based on the input data and the situational data.

These and other features, aspects, and advantages of the present invention are discussed in the following detailed description in accordance with the accompanying drawings throughout which like characters represent similar or like parts.

DETAILED DESCRIPTION

The embodiments described herein, which have been shown and described by way of example, and many of their advantages will be understood by the foregoing description, and it will be apparent that various changes can be made in the form, construction, and arrangement of the components without departing from the disclosed subject matter or without sacrificing one or more of its advantages. Indeed, the described forms of these embodiments are merely explanatory. These embodiments are susceptible to various modifications and alternative fonus, and the following claims are intended to encompass and include such changes and not be limited to the particular forms disclosed, but rather to cover all modifications, equivalents, and alternatives falling with the spirit and scope of this disclosure.

Figure 1:
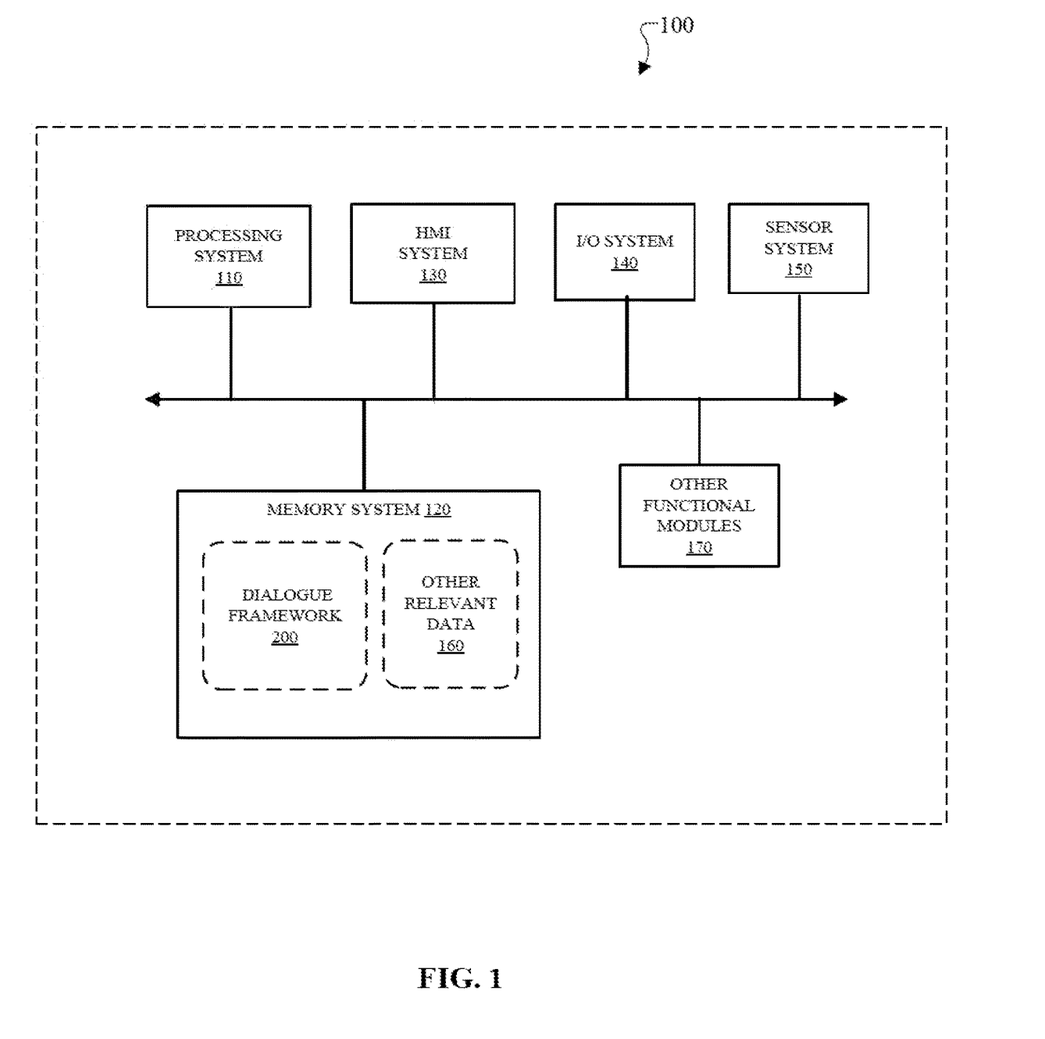
FIG. 1 is a diagram of an example of a system with a dialogue framework according to an example embodiment of this disclosure.

FIG. 1 is a diagram of an example of a system 100, which includes a dialogue framework 200 that leverages neural commonsense reasoning for task-oriented dialogue. The dialogue framework 200 is configured to incorporate external knowledge into a task-oriented dialogue in a scalable manner. For example, the dialogue framework 200 is configured to leverage neural event-centric knowledge via encoding based on generative knowledge graphs, thereby being scalable to represent commonsense knowledge, which is broad and diverse. Moreover, the dialogue framework 200 is advantageously configured to use the neural event-centric commonsense knowledge as an intermediate hop along a multi-hop reasoning path to guide the input towards the output. In addition, the dialogue framework 200 includes an encoder-decoder architecture, which is at least domain agnostic, language agnostic, and task agnostic. Furthermore, the dialogue framework 200 is configured to infer event-centric knowledge (e.g., goal data) from the input (e.g., input data 20 and situational data 30) to ensure that the output is aligned along a same psychological/social relation (e.g., "wants" relation) as the input, thereby providing meaningful human-machine interaction. Moreover, the dialogue framework 200 is configured to generate output, such as event-centric knowledge (e.g., goal data), which provides additional supervision during the training process and provides insight into an intermediate step of the dialogue framework 200 during the testing/employment process.

Referring to FIG. 1, the system 100 includes at least a processing system 110. The processing system 110 includes at least an electronic processor, a central processing unit (CPU), a graphics processing unit (GPU), a microprocessor, a field-programmable gate array (FPGA), an application-specific integrated circuit (ASIC), any suitable processing technology, or any number and combination thereof. The processing system 110 is operable to execute the dialogue framework 200, as described herein.

The system 100 includes at least a memory system 120, which is operatively connected to the processing system 110. In an example embodiment, the memory system 120 includes at least one non-transitory computer readable medium, which is configured to store and provide access to various data to enable at least the processing system 110 to perform the operations and functions of the dialogue framework 200, as disclosed herein. In an example embodiment, the memory system 120 comprises a single computer readable storage device or a plurality of computer readable storage devices. The memory system 120 can include electrical, electronic, magnetic, optical, semiconductor, electromagnetic, or any suitable storage technology that is operable with the system 100. For instance, in an example embodiment, the memory system 120 can include random access memory (RAM), read only memory (ROM), flash memory, a disk drive, a memory card, an optical storage device, a magnetic storage device, a memory module, any suitable type of memory device, or any number and any combination thereof. With respect to the processing system 110 and/or other components of the system 100, the memory system 120 is local, remote, or a combination thereof (e.g., partly local and partly remote). For example, the memory system 120 can include at least a cloud-based storage system (e.g. cloud-based database system), which is remote from the processing system 110 and/or other components of the system 100.

The memory system 120 includes at least the dialogue framework 200 and other relevant data 160, which are stored thereon and accessible therefrom. The dialogue framework 200 includes computer readable data that, when executed by the processing system 110, is configured to generate a system response 80 upon receiving input data 20, which is task-oriented. The computer readable data includes instructions, code, routines, various related data, any suitable software component/technology, or any number and combination thereof. The dialogue framework 200 and/or the other relevant data 160 may include training data, which is used to train, test, and develop any of the machine learning models described herein. The dialogue framework 200 and/ or other relevant data 160 may also include various annotations, various loss data, various parameter data, as well as any related data that enables the dialogue framework 200 to be trained, executed, or both trained and executed to perform the functions as described herein while meeting certain performance criteria. The other relevant data 160 may include any type of situational data, which provides context for input data 20 within the same timeframe. As a non-limiting example, the other relevant data 160 may include weather data, traffic data, environment data, etc. The other relevant data 160 also includes various data (e.g. operating system, etc.), which enables the system 100 to perform the functions as discussed herein.

In an example embodiment, as shown in FIG. 1, the system 100 is configured to include at least one human machine interface (HMI) system 130. The HMI system 130 includes at least one user interface, at least one HMI device, or any umber of combination thereof. For example, the HMI system 130 may include a visual user interface, an auditory user interface, a tactile user interface, any suitable user interface, or any number and combination thereof. The HMI system 130 is operable to communicate with the I/O system 140. The HMI system 130 is also operable to communicate with one or more other components (e.g., processing system 110, memory system 120, etc.) of the system 100. More specifically, for example, the processing system 110 is configured to obtain or extract input data 20 directly or indirectly from the HMI system 130, the memory system 120, and/or the I/O system 140. In response to the input data 20, the processing system 110 is configured to provide the I/O system 140 and/or the HMI system 130 with a system response 80, which is generated via the dialogue framework 200.

In an example embodiment, as shown in FIG. 1, the system 100 is configured to include at least one sensor system 150. The sensor system 150 includes one or more sensor devices. As non-limiting examples, the sensor system 150 includes a global positioning system (GPS) sensor, a temperature sensor, an image sensor, a motion detection sensor, a biosensor, a tactile sensor, a sound sensor, any suitable sensing device, or any number and combination thereof. The sensor system 150 is configured to obtain sensor data, which provides a basis for the situational data 30.

In addition, the system 100 includes other components that contribute to the training and/or execution of the dialogue framework 200. In this regard, for example, the I/O system 140 may include an I/O interface and may include one or more I/O devices (e.g., microphone, keyboard device, touch display device, microphone, mouse, speaker device, etc.). Also, the system 100 includes other functional modules 170, such as any appropriate hardware technology, software technology, or combination thereof that assist with or contribute to the functioning of the system 100 and/or the dialogue framework 200. For example, the other functional modules 170 include communication technology that enables components of the system 100 to communicate with each other as described herein. In general, the system 100 is configured to provide training to the machine learning models of the dialogue framework 200. The system 100 is configured to deploy/employ the dialogue framework 200 for use in another system (e.g. FIG. 6). The system 100 is also configured to employ and run the dialogue framework 200 for real-time use.

Figure 2:
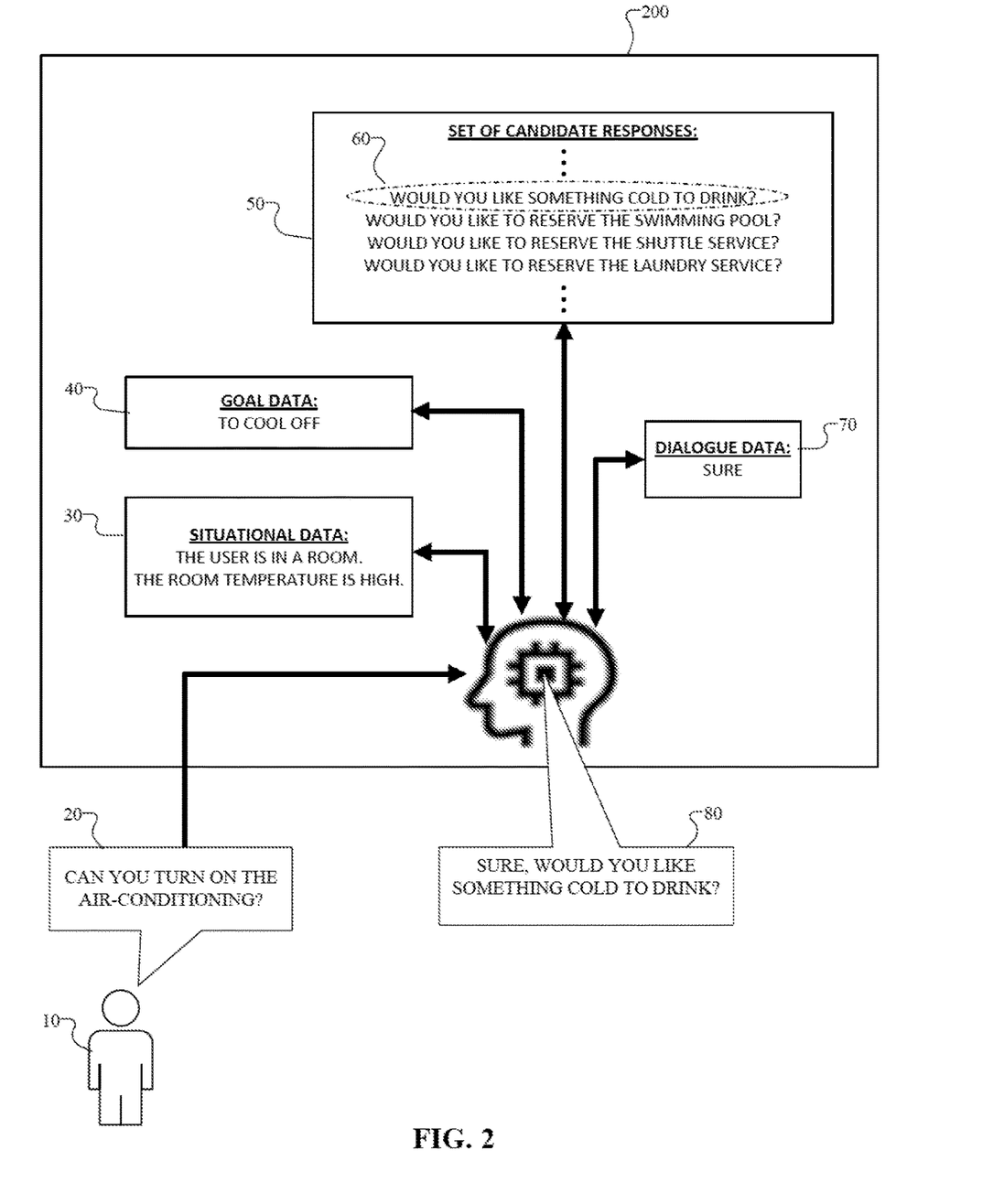
FIG. 2 is a conceptual diagram providing a high-level overview of the dialogue framework with respect to non-limiting task-oriented dialogue according to an example embodiment of this disclosure.

FIG. 2 is a conceptual diagram that provides a high-level overview of a non-limiting example of task-oriented dialogue involving the dialogue framework 200. As shown in FIG. 2, the task-oriented dialogue begins when a user 10 provides the input data 20 of "Can you turn on the air-conditioning?" to the dialogue framework 200. In this case, the input data 20 relates to a task of turning on an air-conditioning unit. The dialogue framework 200 is configured to receive the input data 20 as text data or character data even though the input data 20 may have been obtained by the system 100 in a different form (e.g., speech, motion detection, image data, etc.). In FIG. 2, for instance, the user 10 provides an utterance, which is converted, via the system 100, into text data to be provided as input data 20 for the dialogue framework 200.

In addition, the dialogue framework 200 is configured to obtain situational data 30. The situational data 30 provides context for the input data 20. In this regard, the situational data 30 includes an objective description of a circumstance in which the input data 20 was made. For instance, in FIG. 2, the situational data 30 includes the following, objective description: "The user is in a room. The room temperature is high." The dialogue framework 200 is configured to obtain the situational data 30 from one or more sensors, one or more data sources (e.g., databases, servers, applications, etc.), any suitable system, or any number and combination thereof. As a non-limiting example, in FIG. 2, the dialogue framework 200 receives location data from a location sensor and temperature data from a temperature sensor, whereby the location data provides a location of the user 10 around the time of the utterance and whereby the temperature data provides the temperature at the location of the user 10 around the time of the utterance. The system 100 is configured to convert the sensor data into text data and/or character data and provide this text data and/or character data to the dialogue framework 200 as the situational data 30.

Also, the dialogue framework 200 is configured to include a set of candidate responses 50. The dialogue framework 200 is configured to perform the task of response selection by choosing a best response 60 from among the set of candidate responses 50. The set of candidate responses 50 include a number of predetermined responses, which relate to the application in which the dialogue framework 200 is employed. In FIG. 2, the dialogue framework 200 is applied to a hotel application and thus provides a number of candidate responses that relate to hotel services of one or more hotels. As non-limiting examples, the set of candidate responses 50 include (1) "Would you like something cold to drink?" as a candidate response, (2) "Would you like to reserve the swimming pool?" as a candidate response, (3) "Would you like to reserve the shuttle service?" as a candidate response, and (4) "Would you like to reserve the laundry service?" as a candidate response, as well as a number of other candidate responses. In this regard, the set of candidate responses 50 may include any suitable number of candidate responses, where each candidate response provides a suitable response (e.g., recommendation) for the current application. This response selection feature is advantageous in ensuring that the application only provides responses, which are appropriate and which reside within a scope of the current application (e.g., hotel application).

The dialogue framework 200 is configured to evaluate each candidate response from the set of candidate responses 50 in order to choose the best response 60 for addressing the input data 20. The dialogue framework 200 is configured to select the best response 60 from among the set of candidate responses 50 based on an evaluation process (e.g., a ranking process) involving, for example, likelihood scores as determined with respect to neural commonsense reasoning. More specifically, the dialogue framework 200 is configured to determine or infer goal data 40 based on the input data 20 and the situational data 30. In this regard, the dialogue framework 200 performs a first hop along a multi-hop reasoning path from the input to the output in which the first hop is defined from the input (e.g., input data 20 and situational data 30) to the goal data 40.

The dialogue framework 200 is trained to take into account goal data 40 when generating the likelihood score for each candidate response. In this regard, for example, the dialogue framework 200 is configured to assign a greater likelihood score to a candidate response that exhibits greater alignment with the goal data 40 compared to another candidate response that exhibits lesser alignment with the goal data 40. For example, in FIG. 2, the dialogue framework 200 is configured to determine that the goal data 40 is "to cool off" based on the neural commonsense knowledge embeddings associated with the input data 20 and the situational data 30. In this example, the neural commonsense knowledge embeddings capture psychological and/or social types of commonsense knowledge, which may be event-based, such as goals. In this case, the dialogue framework 200 is configured to determine that the best response 60 is "Would you like something cold to drink?" because its distributed representation is related to a distributed representation of the goal data 40 ("to cool off") via the relation data (e.g., "wants" relation). In this regard, the dialogue framework 200 performs a second hop along a multi-hop reasoning path from the input to the output in which the second hop is defined from the goal data 40 to the best response 60. Upon determining and selecting the best response 60 from the set of candidate responses 50 based on one or more predetermined criteria (e.g. greatest likelihood score), the dialogue framework 200 is configured to provide the best response 60 as a part of the system response 80.

Furthermore, the dialogue framework 200 is configured to include an in-domain dialogue system, which includes dialogue data 70 that directly addresses the input data 20. For example, in FIG. 2, the in-domain dialogue system is configured to communicate with one or more systems (e.g., air conditioning unit) of its network to determine a reply (e.g., "sure" or "no") to the input data 20. In addition, the in-domain dialogue system may be configured to activate one or more controls to fulfil the request of the input data 20. As an example, in FIG. 2, the in-domain dialogue system is configured to generate the reply of "Sure" as dialogue data 70 and also activate one or more controls to turn on the air conditioning unit. Upon generating the dialogue data 70 and upon selecting the best response 60, the dialogue framework 200 is configured to generate a system response 80 that includes the dialogue data 70 and the best response 60. In FIG. 2, for instance, the dialogue framework 200 generates the system response 80 of "Sure, would you like something cold to drink?," thereby providing a reply (e.g., "Sure") that directly addresses the request of the input data 20 while also providing an additional conversational element (e.g., "would you like something cold to drink?") that is aligned with an inferred goal (e.g., "to cool off") of the request of the input data 20 (e.g., "Can you turn on the air-conditioning?"). The dialogue framework 200 is therefore advantageous in being able to provide the user 10 with a richer, more meaningful communication experience in task-oriented dialogue.

As discussed above, FIG. 2 illustrates a non-limiting example in which the dialogue framework 200 leverages goal data 40 to select the best response 60 upon receiving input data 20 and situational data 30. Although the dialogue framework 200 uses goal data as an intermediate hop along a multi-hop reasoning path, the dialogue framework 200 is not limited to goal-oriented modeling. That is, the dialogue framework 200 can be trained to use any relation data to obtain corresponding commonsense reasoning data from an event-centric knowledge graph that is suitable for a particular application. In this regard, for instance, instead of goal modeling with goal data, the dialogue framework 200 can be trained to perform other types of data modeling with other types of commonsense reasoning data. As another example, for instance, the dialogue framework 200 may be trained to perform necessity modeling with necessity data. In such a case, the dialogue framework 200 is configured to leverage necessity data (instead of goal data) as an intermediate hop along the multi-hop reasoning path to select the best response 60 upon receiving input data 20 and situational data 30. As a non-limiting example, when configured for necessity modeling and when given the input data 20 (e.g., "Can you tur on the air-conditioning?") and the situational data 30 (e.g., "The user is in a room. The room temperature is high. The window is open."), the dialogue framework 200 is configured to use the necessity data (e.g., "to turn on the air-conditioning") to determine the best response 60 (e.g., "Please close the window."), which is needed to ensure the effectiveness of turning on the air-conditioning. In this case, for example, the dialogue framework 200 is configured to generate the system response 80 of "Sure, please close the window." As demonstrated above, the dialogue framework 200 is advantageous in being able to use neural event-centric commonsense reasoning data as a guide to select the best response 60 (and/or to generate event-centric knowledge) dynamically based on input data 20 and situational data 30. The dialogue framework 200 is advantageous in providing this foundation for incorporating commonsense knowledge into task-oriented dialogue to provide a richer, more meaningful human-machine interaction.

Figure 3:
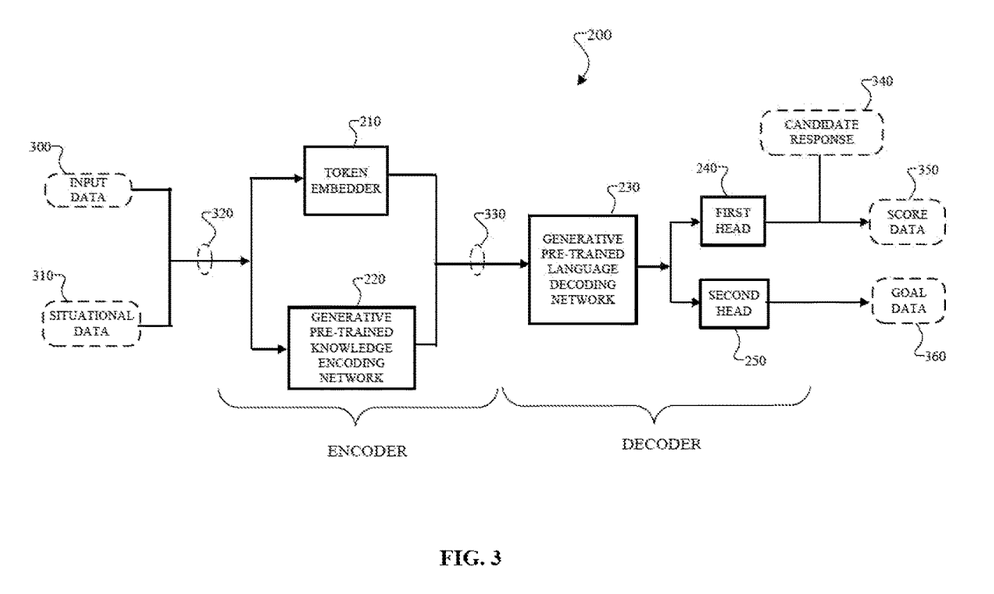
FIG. 3 is a conceptual diagram that shows an architecture of a dialogue framework according to an example embodiment of this disclosure.

FIG. 3 is a conceptual diagram that shows an architecture of the dialogue framework 200 according to an example embodiment. In this example, the dialogue framework 200 is configured for task-oriented dialogue. As shown in FIG. 3, the dialogue framework 200 is configured to obtain input data 300, situational data 310, and a set of candidate responses 340. In addition, the dialogue framework 200 is configured to generate score data 350 (e.g., likelihood score) for each candidate response 340 based on the input data 300 and the situational data 310. The dialogue framework 200 is also configured to select the best response from among the set of candidate responses 340 with respect to one or more predetermined criteria. For instance, the dialogue framework is configured to select the best response as being the candidate response that is associated with the greatest score data 350. In addition, the dialogue framework 200 is advantageously configured to generate goal data 360 to provide an indication of the commonsense reasoning data that is being used in the generation of the score data 350.

The dialogue framework 200 includes an encoder-decoder configuration. The encoder is configured to obtain or receive the input data 300 and the situational data 310. In an example, the encoder is configured to process concatenated data 320, which includes the input data 300 concatenated with the situational data 310. More specifically, the encoder includes at least (i) a first encoding network to provide a first encoded representation of the concatenated data 320 and (ii) a second encoding network to provide a second encoded representation of the concatenated data 320. In this regard, the encoder is configured to provide at least two different encoded representations of the same concatenated data 320. These two different encoded representations are then combined to generate concatenated data 330, which includes the first encoded representation concatenated with the second encoded representation.

The first encoding network includes a token embedder 210. The token embedder 210 is configured to encode the concatenated data 320 into the first encoded representation. The first encoded representation includes a first hidden representation (e.g., a first vector representation) based on a set of tokens, where each token represents a logical part (e.g. a word) of the concatenated data 320. For example, the token embedder 210 is configured to map the concatenated data 320 to a number of vectors in at least one embedding space. The token embedder 210 is advantageously configured to ensure topical similarity with respect to features of the input data 300 and the situational data 310. The token embedder 210 is configured to assist with semantics and clarify natural language ambiguities, which may occur in the input data 300 and the situational data 310. For instance, the token embedder 210 ensures that the dialogue framework 200 is enabled to determine that "a bank" within a particular context of input data 300 (and/or situational data 310) refers to the intended meaning of "a financial institution" instead of another meaning of "an edge of a river." After generating the first encoded representation via the token embedder 210, the dialogue framework 200 is configured to generate the combined encoded representation 330.

The second encoding network includes a generative pre-trained knowledge encoding network 220. The generative pre-trained knowledge encoding network 220 is an encoding component, which is extracted from a first machine learning model. For example, the first machine learning model comprises a first generative pre-trained transformer language model. The first machine learning model is pre-trained with a number of existing, symbolic commonsense knowledge bases. More specifically, for instance, the first machine learning model includes transformers, which are pre-trained to predict commonsense knowledge graphs in response to input data and situational data. In this example, the commonsense knowledge bases and the commonsense knowledge graphs include at least psychological and/or social types of event-centric knowledge (e.g., goals). The generative pre-trained knowledge encoding network 220 is then extracted from this first generative pre-trained transformer language model. More specifically, the encoding component of the first machine learning model is separated from the corresponding decoding component of that first machine learning model. Upon being extracted from the first machine learning model, the encoding component (i.e., the generative pre-trained knowledge encoding network 220) is employed as a part of the encoder of the dialogue framework 200. The generative pre-trained knowledge encoding network 220 is advantageous in being able to encode a given input dynamically with respect to neural event-centric commonsense reasoning even if the given input was unobserved during the pre-training.

Referring to FIG. 3, when employed by the dialogue framework 200, the generative pre-trained knowledge encoding network 220 is incorporated in parallel with the token embedder 210 such that the generative pre-trained knowledge encoding network 220 receives the same input (e.g., concatenated data 320) as the token embedder 210. In this regard, the generative pre-trained knowledge encoding network 220 may be referred to as the second encoding network of the encoder. This second encoding network is configured to encode the concatenated data 320 into the second encoded representation. The second encoded representation includes a second hidden representation (e.g., a second vector representation) based on neural commonsense knowledge embeddings. The encoding component is configured to generate commonsense knowledge embeddings in at least one embedding space dynamically for given input (e.g., concatenated data 320 in FIG. 3). The commonsense knowledge embeddings are associated with psychological and social types of event-centric knowledge (e.g., goals). After generating the second encoded representation via the generative pre-trained knowledge encoding network 220, the dialogue framework 200 is configured to generate the combined encoded representation 330.

The encoder is configured to output the first encoded representation from the token embedder 210 and the second encoded representation from the generative pre-trained knowledge encoding network 220. The dialogue framework 200 is configured to concatenate the first encoded representation and the second encoded representation to generate the combined encoded representation 330. The encoder is operably connected to the decoder. The encoder is configured to provide the combined encoded representation 330 to the decoder.

The decoder includes a generative pre-trained language decoding network 230, which is a decoding component that is extracted from a second machine learning model. The second machine learning model comprises a second generative pre-trained language model. Also, the second machine learning model is an autoregressive language model that includes a transformer. The second machine learning model is configured to be domain agnostic, language agnostic, and task agnostic. In this regard, for instance, the second machine learning model is pre-trained with a diverse corpus of unlabeled text. More specifically, for instance, the second machine learning model includes transformers, which are pre-trained to perform one or more tasks, such as (i) predicting event-centric knowledge (e.g., goal data) and (ii) predicting score data to select response data from among a set of candidate responses 340, according to given input (e.g., input data 300 and situational data 310). The decoding component is then extracted from this second generative pre-trained transformer language model. More specifically, the decoding component of the second generative pre-trained language model is separated from the corresponding encoding component of that second generative pre-trained language model. Upon being extracted from the second generative pre-trained language model, the generative pre-trained language decoding network 230 is employed as the decoder of the dialogue framework 200. The generative pre-trained language decoding network 230 is advantageous in being able to decode a given input dynamically with respect to neural event-centric commonsense reasoning to perform one or more tasks, such as predicting score data and predicting goal data.

Referring to FIG. 3, when employed by the dialogue framework 200, the decoder is configured to receive the combined encoded representation 330 from the encoder. As aforementioned, the combined encoded representation 330 is a concatenation that includes the first encoded representation from the token embedder 210 and the second encoded representation from the generative pre-trained knowledge encoding network 220. The decoder is configured to decode the combined encoded representation 330 to generate output data, which includes score data 350 and goal data 360. More specifically, for instance, in FIG. 3, the generative pre-trained language decoding network 230 comprises a multilayer transformer-decoder. This multilayer transformer-decoder includes (i) a first language modeling head 240 to generate the score data 350 for a candidate response and (ii) a second language modeling head 250 to generate the goal data 360. The first language modeling head 240 includes a final fully-connected layer followed by softmax on top of or after the last layer of the generative pre-trained language decoding network 230. The second language modeling head 250 includes a final fully-connected layer followed by softmax on top of or after the last layer of the generative pre-trained language decoding network 230.

Figure 4:
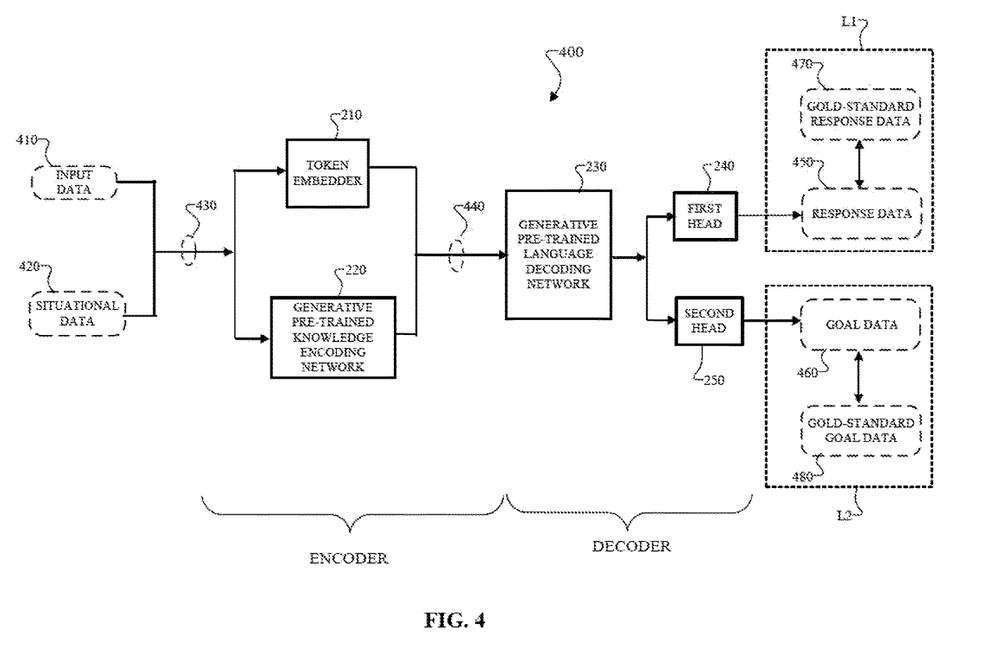
FIG. 4 is a conceptual diagram that shows aspects of a training process of the dialogue framework according to an example embodiment of this disclosure.
Figure 5:
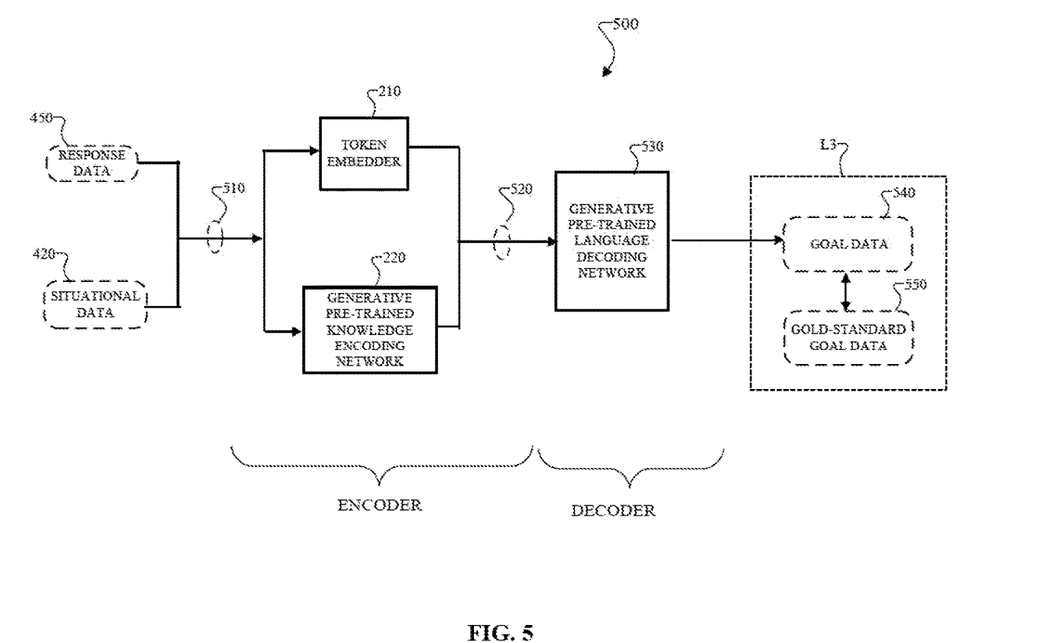
FIG. 5 is a conceptual diagram that shows aspects of another training process of the dialogue framework according to an example embodiment of this disclosure.

FIGS. 4 and 5 illustrate conceptual diagrams relating to the development of the dialogue framework 200 of FIG. 3 according to an example embodiment. The development of the dialogue framework 200 includes at least a forward training process 400 involving a speaker type of training model and a recursive training process 500 involving a listener type of training model. More specifically, FIG. 4 illustrates the forward training process 400 in which the dialogue framework 200 is trained with a first set of training data, which includes input data 410 and situational data 420.

The dialogue framework 200 is trained with a sufficient amount of this training data to ensure that the dialogue framework 200 is configured to operate at a predetermined performance threshold during testing and/or employment.

Upon receiving the input data 410 and the situational data 420, the dialogue framework 200 is configured to provide concatenated data 430 to the encoder. The concatenated data 430 includes the input data 410 and the situational data 420. The encoder is configured to generate a first encoded representation of the concatenated data 430 via the token embedder 210. The encoder is also configured to generate a second encoded representation of the concatenated data 430 via the generative pre-trained knowledge encoding network 220. The first encoded representation and the second encoded representation are provided to the decoder as a combined encoded representation 440. The decoder is configured to decode the combined encoded representation 440 via the generative pre-trained language decoding network 230. In addition, the first language model head 240 is configured to generate response data 450 based on the input data 410 and the situational data 420. Also, the second language model head 250 is configured to generate goal data 460 based on the input data 410 and the situational data 420.

During this forward training process, the dialogue framework 200 is configured to generate response data 450. In addition, the dialogue framework 200 is configured to generate first loss data L1 by comparing the generated response data 450 with gold-standard response data 470 for given input data 410 and given situation data 420. The forward training process also includes generating second loss data L2 by comparing the generated goal data 480 with gold-standard goal data 480 for given input data 410 and given situation data 420. The first loss data L1 and the second loss data L2 are used to optimize the dialogue framework 200. In addition, the forward training process includes fine-tuning the internal parameters of the dialogue framework 200 to maximize the likelihood of generating the gold-standard response data and the gold-standard goal data.

FIG. 5 illustrates a recursive training process 500 in which an encoder-decoder configuration is trained with a second set of training data. The encoder-decoder configuration of FIG. 5 includes the same encoder of FIGS. 3 and 4, but a different decoder than that of FIGS. 3 and 4. The recursive training process 500 is advantageous in providing additional supervision for training the token embedder 210 and the generative pre-trained knowledge encoding network 220. The recursive training process 500 is configured to make use of the generated response data 450 of the forward training process 400 (FIG. 4). That is, in addition to providing training for the dialogue framework 200, the forward training process 400 also serves as a data augmentation process for providing a second set of training data for the recursive training process 500. For example, in FIG. 5, the second set of training data includes the same situation data 420 as the first set of training data along with the corresponding response data 450, which was generated by the dialogue framework 200 of FIG. 4. The second set of training data is a sufficient amount to ensure that the encoder is configured to operate at a predetermined performance threshold during testing and/or employment.

Upon receiving the situational data 420 and the response data 450, the encoder-decoder configuration of FIG. 5 is configured to provide concatenated data 510 to the encoder. The concatenated data 510 includes the situational data 420 and the response data 450. The encoder is configured to generate a first encoded representation of the concatenated data 510 via the token embedder 210. The encoder is also configured to generate a second encoded representation of the concatenated data 510 via the generative pre-trained knowledge encoding network 220. The first encoded representation and the second encoded representation are provided to the decoder as a combined encoded representation 520. The decoder is configured to decode the combined encoded representation 520 via the generative pre-trained language decoding network 530. In this case, the decoder of FIG. 5 is different from the decoder of FIG. 4. More specifically, the decoder of FIG. 5 includes a generative pre-trained language decoding network 530, which is trained to generate goal data 540 based on response data 450 and situational data 420.

In addition, this recursive training process 500 includes generating third loss data L3 by comparing the generated goal data 540 to the gold-standard goal data 550 for given situational data 420 and given generated response data 450. The third loss data L3 is used to optimize the encoder-decoder configuration of FIG. 5, particularly the encoder, which is configured to be employed in the dialogue framework 200 of FIG. 3. In addition, this recursive training process 500 includes fine-tuning the internal parameters of the encoder-decoder configuration of FIG. 5 to maximize the likelihood of generating the gold-standard goal data.

Figure 6:
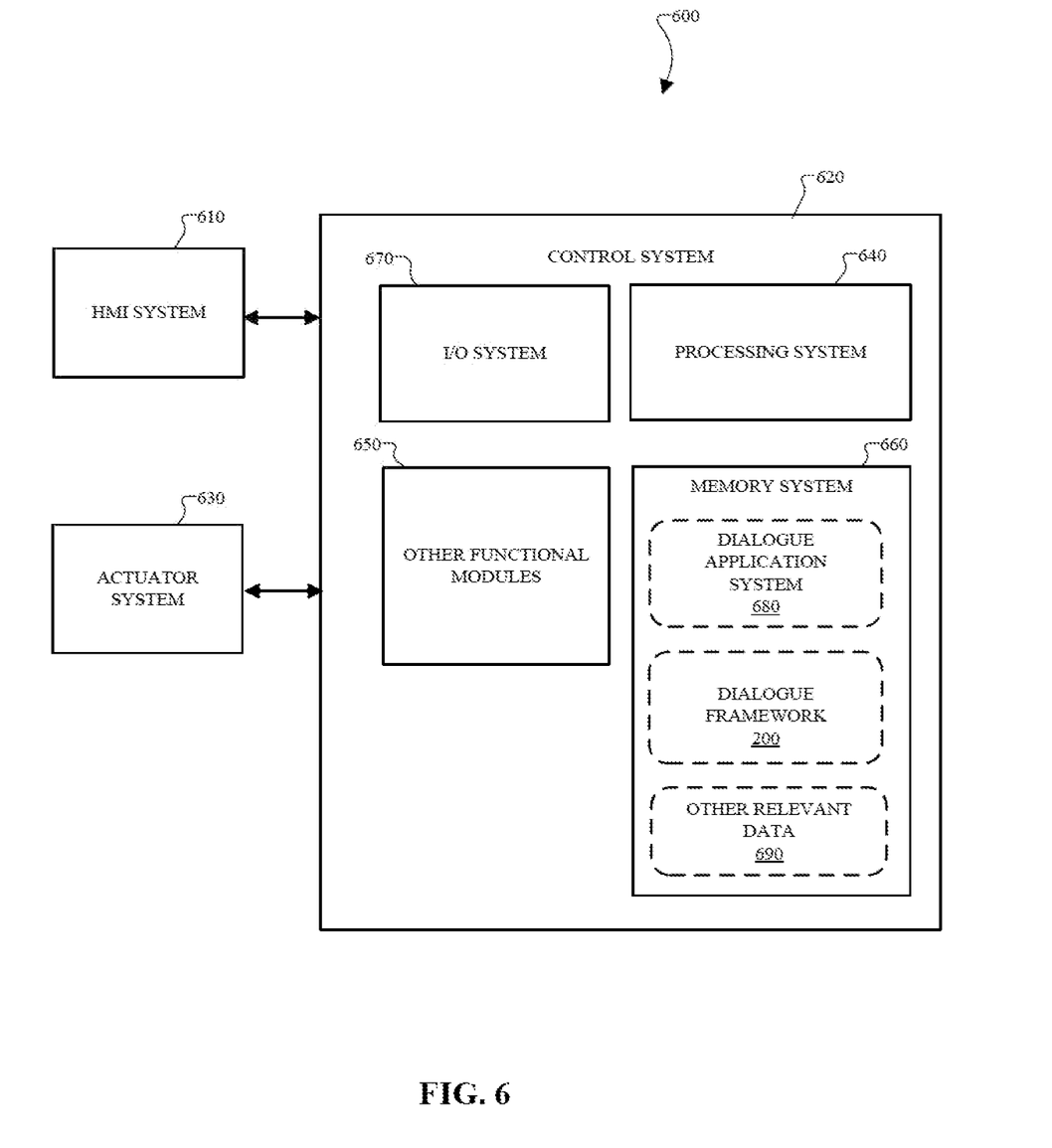
FIG. 6 is a diagram of an example of a control system that employs the dialogue framework of FIG. 1 according to an example embodiment of this disclosure.

FIG. 6 is a diagram of a system 600, which is configured to include at least the dialogue framework 200. In this regard, the system 600 includes at least an HMI system 610, a control system 620, and an actuator system 630. The system 600 is configured such that the control system 620 controls the actuator system 630 based on the input received from the HMI system 610. More specifically, the HMI system 610 includes one or more user interfaces and/or devices that communicate with one or more I/O devices of the I/O system 670. Upon obtaining input, the HMI system 710 is operable to communicate with the control system 620 via the input/output (I/O) system 670 and/or other functional modules 650, which includes communication technology.

The control system 620 is configured to obtain input from the HMI system 610. Upon receiving input, the control system 620 is operable to process the input via a processing system 640. In this regard, the processing system 640 includes at least one processor. For example, the processing system 640 includes an electronic processor, a central processing unit (CPU), a graphics processing unit (GPU), a microprocessor, a field-programmable gate array (FPGA), an application-specific integrated circuit (ASIC), processing circuits, any suitable processing technology, or any combination thereof. Upon processing at least the input received from the HMI system 610, the processing system 640 is operable to provide the dialogue framework 200 with input data 20 that includes a request to perform a task. The processing system 640 is also configured to generate at least a system response 80 via the dialogue framework 200. The processing system 640 is configured to generate output data based on the system response 80, which includes (i) dialogue data 70 that addresses the request and (ii) the best response 60 that is selected from the set of candidate responses 50. The processing system 640 is configured to provide the output data to the user via the I/O system 670 and/or the HMI system 610. In addition, the processing system 640 is operable to generate actuator control data based on the output data. The control system 620 is configured to control the actuator system 630 according to the actuator control data.

The memory system 660 is a computer or electronic storage system, which is configured to store and provide access to various data to enable at least the operations and functionality, as disclosed herein. The memory system 660 comprises a single device or a plurality of devices. The memory system 660 includes electrical, electronic, magnetic, optical, semiconductor, electromagnetic, any suitable memory technology, or any combination thereof. For instance, the memory system 660 may include random access memory (RAM), read only memory (ROM), flash memory, a disk drive, a memory card, an optical storage device, a magnetic storage device, a memory module, any suitable type of memory device, or any number and combination thereof. In an example embodiment, with respect to the control system 620 and/or processing system 640, the memory system 560 is local, remote, or a combination thereof (e.g., partly local and partly remote). For example, the memory system 660 is configurable to include at least a cloud-based storage system (e.g. cloud-based database system), which is remote from the processing system 640 and/or other components of the control system 620.

The memory system 660 includes the dialogue framework 200. Also, in an example, the memory system 660 includes a dialogue application system 680. The dialogue application system 680 is configured to ensure that the dialogue framework 200 is provided with input data 20, which includes a request to perform a task in text form. In this regard, the processing system 640, via the dialogue application system 680, is configured to process the input from the HMI system 610. If deemed necessary, the dialogue application system 680 is configured to generate input data 20 upon processing the input from the HMI system 610. In addition, the dialogue application system 680 is configured to generate output data in any suitable form (e.g., speech, text, etc.) based on the system response 80 obtained from the dialogue framework 200. In general, the dialogue application system 680 enables the dialogue framework 200 to operate seamlessly as a part of the control system 620 for the desired application.

Furthermore, as shown in FIG. 6, the system 600 includes other components that contribute to operation of the control system 620 in relation to the HMI system 610 and the actuator system 630. For example, as shown in FIG. 6, the memory system 660 is also configured to store other relevant data 690, which relates to the operation of the system 600. Also, as shown in FIG. 6, the control system 620 includes the I/O system 670, which includes one or more I/O devices that relate to the system 600. Also, the control system 620 is configured to provide other functional modules 650, such as any appropriate hardware technology, software technology, or any combination thereof that assist with and/or contribute to the functioning of the system 600. For example, the other functional modules 650 include an operating system and communication technology that enables components of the system 600 to communicate with each other as described herein. Also, the components of the system 600 are not limited to this configuration, but may include any suitable configuration as long as the system 600 performs the functionalities as described herein. For example, the HMI system 610 may be at least partly integral with the I/O system 670 and/or the control system 620. Accordingly, the system 600 is useful in various applications.

Figure 7:
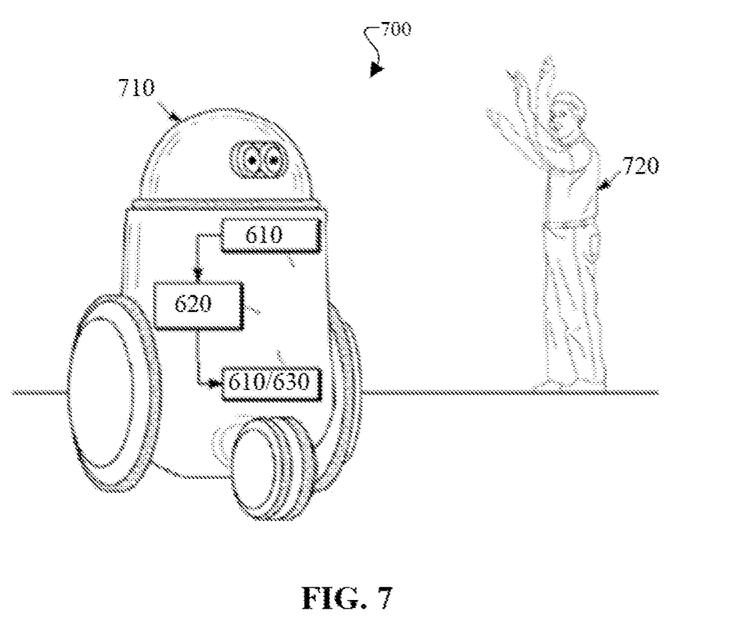
FIG. 7 is a diagram of an example of the control system of FIG. 6 with respect to robot and/or automated personal assistant technology according to an example embodiment of this disclosure.

FIG. 7 is a diagram of an example of an application of the dialogue framework 200 with respect to automated personal assistant technology 700 according to an example embodiment. For instance, as one non-limiting example, the automated personal assistant technology 700 is a robot 710, which is configured to receive input data 20 that includes an utterance with a request to perform a task. The automated personal assistant technology 700 is configured to process this utterance and provide input data 20 as text to the dialogue framework 200. In response to the input data 20, the automated personal assistant technology 700 is configured to provide the system response 80 to the user 720. In addition, the automated personal assistant technology 700 is configured to control an appliance, such as a washing machine, a stove, a vacuum cleaner, an oven, a microwave, a dishwasher, another type of domestic appliance, any suitable apparatus, or any number and combination thereof. The HMI system 610 includes at least one user interface that operates together with the I/O system 670 (e.g., a microphone, a touchscreen, a keyboard, display technology, gesturing technology, a camera, a sensor, or any suitable technology) to obtain input.

The control system 620 is configured to obtain the input from the user 720 via the HMI system 610 and/or the I/O system 670. The control system 620 is configured to process the input. The control system 620 is configured provide input data 20 as text data based on the input. In addition, the control system 620 is configured provide a system response 80 in response to the input data 20 and the situational data 30 via the dialogue framework 200. The control system 620 is configured to generate output data based on the system response 80. The control system 620 is configured to provide the system response 80 to the I/O system 670 and/or the HMI system 610. The control system 620 is configured to generate actuator control data based on the system response 80. Also, as a non-limiting example, in response to the actuator control data, the control system 620 is configured to control the actuator system 630.

Figure 8:
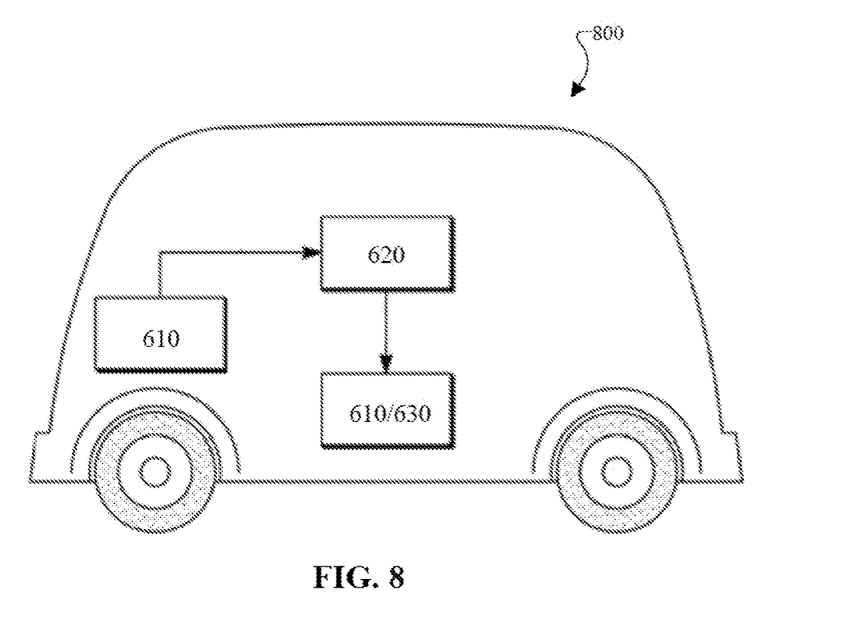
FIG. 8 is a diagram of an example of the control system of FIG. 6 with respect to mobile machine technology according to an example embodiment of this disclosure.

FIG. 8 is a diagram of an example of an application of the system 100 with respect to mobile machine technology according to an example embodiment. As a non-limiting example, the mobile machine technology includes a vehicle 800, which is at least partially autonomous or fully autonomous. In FIG. 8, the vehicle 800 includes an HMI system 610, which is configured to receive input. Based on the input, the control system 620 is configured to provide at least input data 20 to the dialogue framework 200. The dialogue framework 200 is configured to provide a system response 80 in response to the input data 20. The control system 620 is configured to generate actuator control data, which is at least based on the system response 80. For instance, as a non-limiting example, the actuator system 630 is configured to actuate at least the braking system to stop the vehicle 800 upon receiving the actuator control data. In this regard, the actuator system 630 is configured to include a braking system, a propulsion system, an engine, a drivetrain, a steering system, or any number and combination of actuators of the vehicle 700. The actuator system 630 is configured to control the vehicle 800 so that the vehicle 800 follows rules of the roads and avoids collisions based at least on the system response 80 provided by the dialogue framework 200.

As described herein, the dialogue framework 200 provides a number of advantageous features, as well as benefits. For example, the dialogue framework 200 is configured to leverage neural commonsense reasoning for task-oriented dialogue. By leveraging neural commonsense reasoning, the task-oriented dialogue systems are enabled to provide a richer and more flexible human-machine interaction that more closely resembles human-human interaction. More specifically, for example, the dialogue framework 200 leverages a scalable commonsense reasoning encoder, which is domain-agnostic and language-agnostic. In this regard, the commonsense reasoning encoder is particularly beneficial in conversational assistance scenarios, where conversational items such as, alternative suggestions, follow-up requests, or other similar comments are desired. Also, the commonsense reasoning encoder leverages a generative, commonsense knowledge base, which captures psychological and social types of event-centric knowledge (e.g., goals, prerequisites, and consequences of events), which is advantageous in inducing helpful responses in various scenarios, such as assistance scenarios.

The dialogue framework 200 is also configured to overcome a number of the technical problems, which tend to arise when incorporating knowledge representation and reasoning into task-oriented dialogue. For example, these technical problems include (i) inferior scalability of knowledge, (ii) restricted types of knowledge, and (iii) difficulties in operationalizing knowledge for dialogues. More specifically, with respect to scalability, the dialogue framework 200 is configured to provide a scalable knowledge representation via pre-trained knowledge embeddings that enable unobserved data to be generalized. The dialogue framework 200 also incorporates a generative knowledge base and operates in an embedding space in which language expressions and symbolic knowledge pieces are seamlessly expressed as real-valued vectors with the intension that words, phrases, and/or any suitable language unit with similar meanings are placed in similar locations within the embedding space. In addition, with respect to knowledge types, the dialogue framework 200 is configured to leverage a commonsense knowledge base, which captures psychological and social types of event-centric knowledge, such as goals, prerequisites, and consequences of events in order to induce helpful responses in various scenarios. Also, with respect to the operationalizing knowledge for dialogues, the dialogue framework 200 undergoes a training process that is anchored by implicit goals. The dialogue framework 200 is trained to learn how to encode information about goals and also generate response data that links to the goal data. The dialogue framework 200 is therefore enabled to provide response data, which shares the same goal as the input data.

Furthermore, the dialogue framework 200 shows significant improvement over some other configurations. For example, the dialogue framework 200 provides a scalability factor, which is not achievable by some rule-based configurations that may fail to operate on unobserved cases for which its predetermined set of rules do not apply. In addition, the dialogue framework 200 is configured to use commonsense reasoning to provide greater supervision during training and provide greater interpretability over most end-to-end neural model configurations. The dialogue framework 200 is configured to provide greater interpretability by ensuring that the response data is aligned with a similar or equivalent goal as the request data. In addition, during employment, the dialogue framework 200 is configured to generate goal data, which provides an indication as to the inner workings of the response-selection process, which would otherwise appear to operate in a black-box manner without the goal data.

That is, the above description is intended to be illustrative, and not restrictive, and provided in the context of a particular application and its requirements. Those skilled in the art can appreciate from the foregoing description that the present invention may be implemented in a variety of forms, and that the various embodiments may be implemented alone or in combination. Therefore, while the embodiments of the present invention have been described in connection with particular examples thereof, the general principles defined herein may be applied to other embodiments and applications without departing from the spirit and scope of the described embodiments, and the true scope of the embodiments and/or methods of the present invention are not limited to the embodiments shown and described, since various modifications will become apparent to the skilled practitioner upon a study of the drawings, specification, and following claims. For example, components and functionality may be separated or combined differently than in the manner of the various described embodiments, and may be described using different terminology. These and other variations, modifications, additions, and improvements may fall within the scope of the disclosure as defined in the claims that follow.

What is claimed is:

1. A computer-implemented method for training a dialogue framework, the method comprising:
receiving input data;
obtaining situational data that provides context for the input data;
creating a first dataset that includes at least concatenated data, the concatenated data including at least a concatenation of the input data and the situational data;
generating, via an encoder, an encoded representation of the first dataset, the encoder including (i) a token embedder and (ii) an encoding network of a first pre-trained generative machine learning model that relates to a generative knowledge graph, the token embedder being configured in parallel with the encoding network such that the token embedder and the encoding network receive the same concatenated data as input:
generating, via a decoder, response data based on the first dataset by decoding the encoded representation, the decoder including a decoding network of a second pre-trained generative machine learning model that includes a first language model head and a second language model head; and
generating, via the decoder, goal data based on the first dataset by decoding the encoded representation,
wherein,
the goal data is used in multi-hop reasoning to guide the input data to the response data via the generative knowledge graph,
the first language model head generates the response data, and
the second language model head generates the goal data.

2. The computer-implemented method of claim 1, further comprising:
generating first encoded data by encoding the concatenated data via a first encoding scheme performed by the token embedder; and
generating second encoded data by encoding the concatenated data via a second encoding scheme performed by the encoding network,
wherein the encoded representation includes the first encoded data and the second encoded data.

3. The computer-implemented method of claim 2, wherein:
the first encoding scheme includes token embedding in an embedding space; and
the second encoding scheme includes knowledge embedding with respect to the generative knowledge graph that includes event-based data.

4. The computer-implemented method of claim 1, further comprising:
creating a second dataset that includes the response data and the situational data;

generating, via the encoder, an encoded representation of the second dataset;

generating, via another decoder, additional goal data using the encoded representation of the second dataset, the another decoder including a decoding network of a third pre-trained generative machine learning model; and fine-tuning the encoder based on loss data associated with the goal data and the additional goal data.

5. The computer-implemented method of claim 1, wherein the encoding network of the first pre-trained generative machine learning model is domain agnostic and language agnostic.

6. The computer-implemented method of claim 1, wherein the decoding network of the second pre-trained generative machine learning model is domain agnostic and language agnostic.

7. A system comprising:

at least one non-transitory computer readable medium including computer readable data; and a processor operably connected to the at least one non-transitory computer readable medium, the processor being configured to execute the computer readable data to perform a method that includes:

receiving input data;

obtaining situational data that provides context for the input data;

creating a first dataset that includes concatenated data, the concatenated data including at least a concatenation of the input data and the situational data;

generating, via an encoder, an encoded representation of the first dataset, the encoder including (i) a token embedder and (ii) an encoding network of a first pre-trained generative machine learning model that relates to a generative knowledge base, the token embedder being configured in parallel with the encoding network such that the token embedder and the encoding network receive the same concatenated data as input;

generating, via a decoder, response data based on the first dataset by decoding the encoded representation, the decoder including a decoding network of a second pre-trained generative machine learning model that includes a first language model head and a second language model head; and generating, via the decoder, goal data based on the first dataset by decoding the encoded representation, wherein the input data and the response data are connected to the goal data via the generative knowledge base, the first language model head generates the response data, and the second language model head generates the goal data.

8. The system of claim 7, further comprising:

generating first encoded data by encoding the concatenated data via a first encoding scheme; and generating second encoded data by encoding the concatenated data via a second encoding scheme;

wherein the encoded representation includes the first encoded data and the second encoded data.

9. The system of claim 8, wherein:

the first encoding scheme includes token embedding in an embedding space; and the second encoding scheme includes knowledge embedding with respect to the generative knowledge base that includes event-based data.

10. The system of claim 7, further comprising:

creating a second dataset that includes the response data and the situational data;

generating, via the encoder, an encoded representation of the second dataset;

generating, via another decoder, another goal data using the second dataset, the another decoder including a decoding network of a third pre-trained generative machine learning model; and fine-tuning the encoder based on loss data relating to the goal data and the another goal data.

11. The system of claim 7, wherein the encoding network of the first pre-trained generative machine learning model is domain agnostic and language agnostic.

12. The system of claim 7, wherein the decoding network of the second pre-trained generative machine learning model is domain agnostic and language agnostic.

13. A computer-implemented method comprising:

receiving input data;

obtaining situational data that provides context for the input data;

generating concatenated data, the concatenated data including at least a concatenation of the input data and the situational data;

obtaining a set of candidate responses;

generating, via an encoder, an encoded representation of the input data and the situational data, the encoder including (i) a token embedder and (ii) an encoding network of a first pre-trained generative machine learning model that relates to a generative knowledge graph, the token embedder being configured in parallel with the encoding network such that the token embedder and the encoding network receive the same concatenated data as input:

generating, via a decoder, goal data by decoding the encoded representation of the input data and the situational data, the decoder including a decoding network of a second pre-trained generative machine learning model that includes a first language model head and a second language model head; and generating, via the decoder, a likelihood score for each candidate response of the set of candidate responses based on the input data and the situational data, wherein, the first language model head generates the likelihood score data, and the second language model head generates the goal data.

14. The computer-implemented method of claim 13, further comprising:

selecting a best candidate response from among the set of candidate responses based on an evaluation of the likelihood scores of the set of candidate responses; and outputting a system response that includes the best candidate response.

15. The computer-implemented method of claim 13, further comprising:

generating first encoded data by encoding the concatenated data via a first encoding scheme; and generating second encoded data by encoding the concatenated data via a second encoding scheme, wherein the encoded representation includes the first encoded data and the second encoded data.

16. The computer-implemented method of claim 15, wherein:

the first encoding scheme includes token embedding in an embedding space; and the second encoding scheme includes knowledge embedding with respect to the generative knowledge graph that includes event-based data.

17. The computer-implemented method of claim 13, wherein the encoding network of the first pre-trained generative machine learning model is domain agnostic and language agnostic.

18. The computer-implemented method of claim 13, wherein the decoding network of the second pre-trained generative machine learning model is domain agnostic and language agnostic.

\* \* \* \* \*